(12) United States Patent
Van Den Biggelaar et al.

(10) Patent No.: US 10,084,342 B2
(45) Date of Patent: Sep. 25, 2018

(54) TRANSFER LAYER FOR WIRELESS CAPACITIVE POWER

(75) Inventors: Theodorus Johannes Petrus Van Den Biggelaar, Veldhoven (NL); Oscar Hendrikus Willemsen, Den Bosch (NL); Dave Willem Van Goor, Nederweert eind (NL); Eberhard Waffenschmidt, Aachen (DE); Adrianus Sempel, Waalre (NL); Lieven Raf Roger Desmet, Eindhoven (NL); Henricus Theodorus Van Der Zanden, Sint-Oedenrode (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 628 days.

(21) Appl. No.: 14/237,901

(22) PCT Filed: Aug. 13, 2012

(86) PCT No.: PCT/IB2012/054110
§ 371 (c)(1),
(2), (4) Date: Aug. 21, 2015

(87) PCT Pub. No.: WO2013/024419
PCT Pub. Date: Feb. 21, 2013

(65) Prior Publication Data
US 2016/0141096 A1    May 19, 2016

Related U.S. Application Data

(60) Provisional application No. 61/523,961, filed on Aug. 16, 2011, provisional application No. 61/658,005, filed on Jun. 11, 2012.

(51) Int. Cl.
*H01F 38/14* (2006.01)
*H02J 50/05* (2016.01)
(Continued)

(52) U.S. Cl.
CPC ............. *H02J 50/05* (2016.02); *H01F 38/14* (2013.01); *H02J 7/025* (2013.01); *H02J 17/00* (2013.01);
(Continued)

(58) Field of Classification Search
CPC .... H01F 38/14; H01F 2038/146; H02J 17/00; H02J 7/0042; H02J 7/025; H04B 5/0012; H04B 5/0037
(Continued)

(56) References Cited

U.S. PATENT DOCUMENTS 5,714,864 A * 2/1998 Rose .................. B60L 11/1818
320/109
9,300,135 B2 * 3/2016 Ichikawa ................ H02J 7/025
(Continued)

FOREIGN PATENT DOCUMENTS

WO    9728595 A1    8/1997
WO    20100150317 A1    12/2010

*Primary Examiner* — Rexford Barnie
*Assistant Examiner* — Elim Ortiz
(74) *Attorney, Agent, or Firm* — Akarsh P. Belagodu

(57) ABSTRACT

A power receiver device including: a pair of receiver electrodes (341, 342) for capacitively coupling with the pair of transmitter electrodes (321, 322) placed on one side of a surface; and a deformable transfer layer (371, 372) placed between each of the pair of the receiver electrodes and another side of the surface. A power signal generated by the power driver (110) is wirelessly transferred from the pair of transmitter electrodes (321, 322) to the pair of receiver electrodes (341, 342) to power a load (150) in the power receiver device.

9 Claims, 3 Drawing Sheets

(51) Int. Cl.
  *H02J 7/02* (2016.01)
  *H02J 17/00* (2006.01)
  *H04B 5/00* (2006.01)
  *H02J 7/00* (2006.01)
(52) U.S. Cl.
  CPC ......... *H04B 5/0012* (2013.01); *H04B 5/0037* (2013.01); *H01F 2038/146* (2013.01); *H02J 7/0042* (2013.01)
(58) Field of Classification Search
  USPC ........................................................ 307/104
  See application file for complete search history.

(56) References Cited

U.S. PATENT DOCUMENTS

| | | | |
|---|---|---|---|
| 2005/0288590 A1* | 12/2005 | Kaplan | A61B 5/00 600/459 |
| 2007/0126393 A1 | 6/2007 | Bersenev | |
| 2009/0159677 A1* | 6/2009 | Yakimov | H05B 33/0896 235/439 |
| 2009/0302690 A1* | 12/2009 | Kubono | H02J 17/00 307/109 |
| 2010/0087143 A1* | 4/2010 | Bonin | H02J 5/00 455/41.1 |
| 2012/0038223 A1* | 2/2012 | Harakawa | H02J 5/005 307/109 |
| 2016/0256100 A1* | 9/2016 | Jacofsky | A47C 31/123 |

* cited by examiner

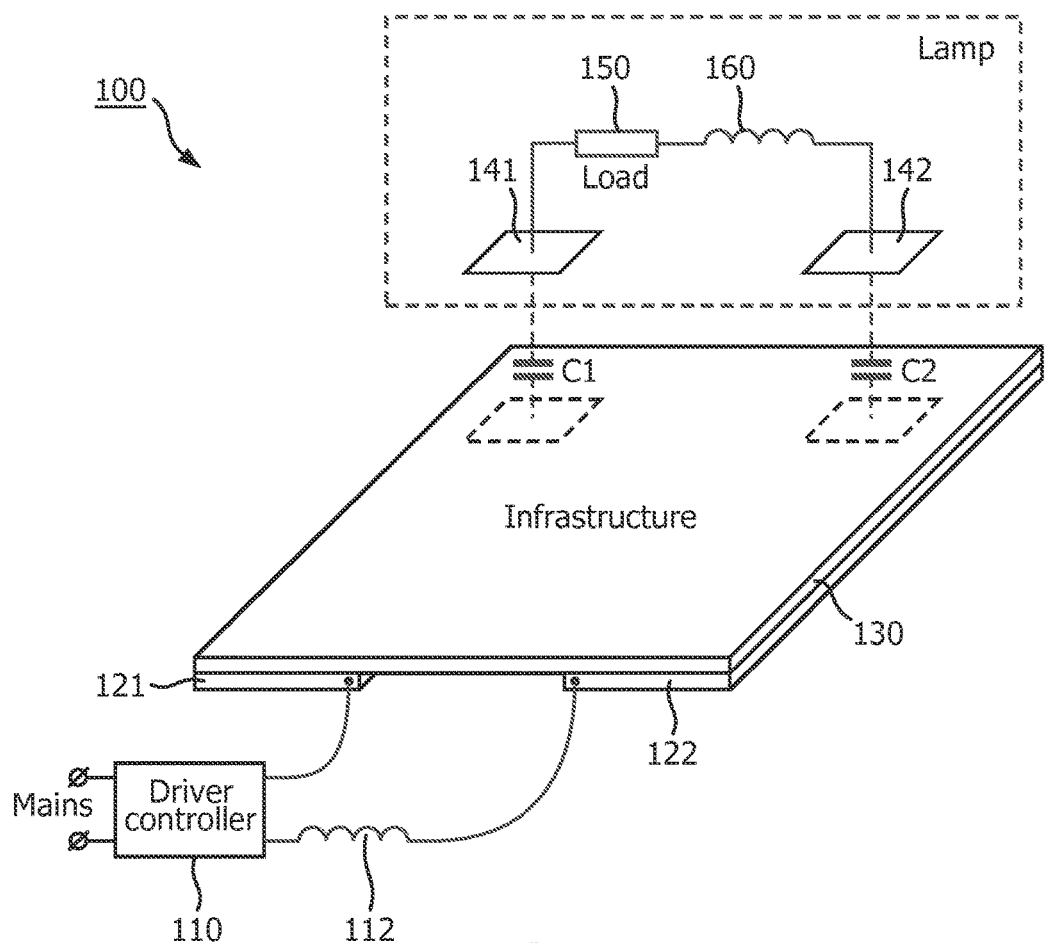
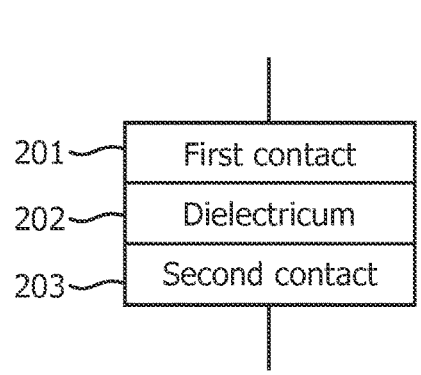
FIG. 2A
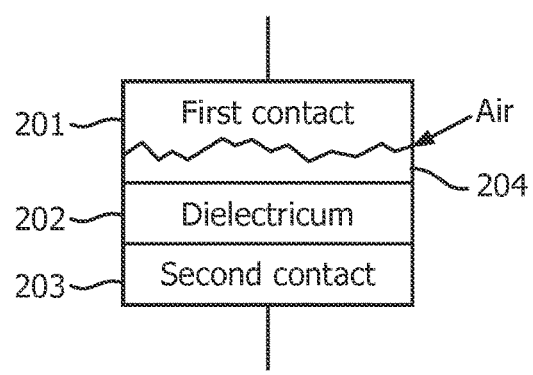
FIG. 2B

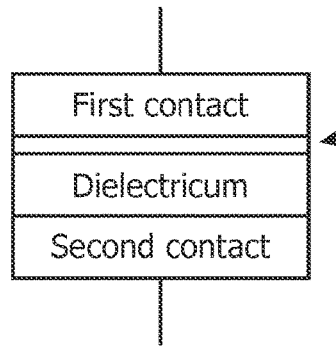
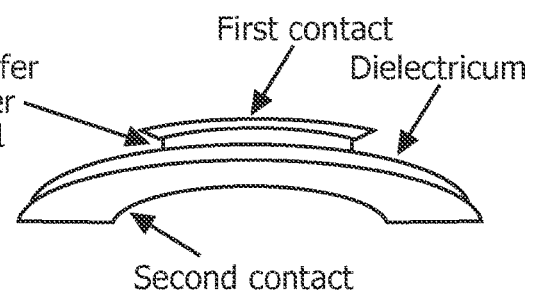
FIG. 4A    FIG. 4B
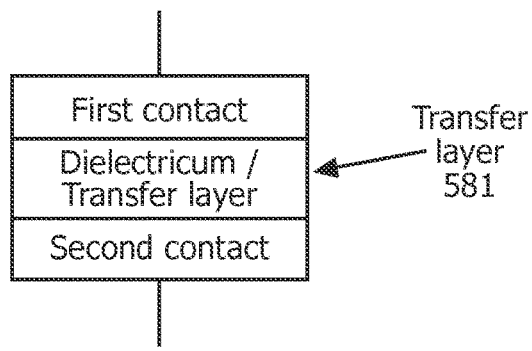
FIG. 5
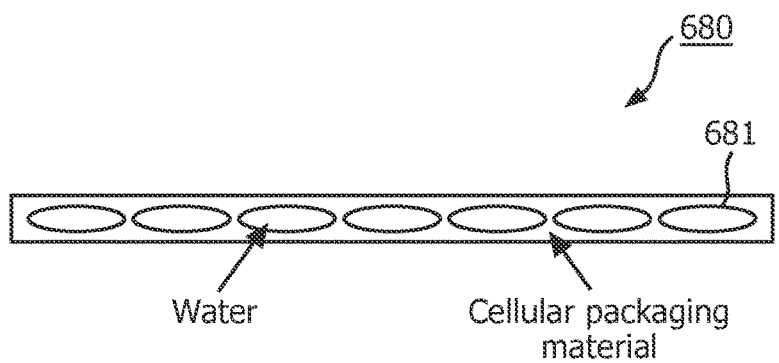
FIG. 6

TRANSFER LAYER FOR WIRELESS CAPACITIVE POWER

This application claims the benefit of U.S. provisional application No. 61/523,961 filed on Aug. 16, 2011.

The invention generally relates to capacitive powering systems for wireless power transfers and, more particularly, to transfer layers between transmitter and receiver electrodes for efficient power transfers from a surface.

A wireless power transfer refers to supplying electrical power without the use of wires or contacts. Thus, the powering of electronic devices is performed through a wireless medium. Capacitive coupling is one technique for transferring power wirelessly. This technique is predominantly utilized in data transfer and sensing applications. For example, a car-radio antenna glued on a window is capacitively coupled with a pick-up element inside the car. The capacitive coupling technique is also utilized for contactless charging of electronic devices.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

FIG. 1 is a typical arrangement of a capacitive power transfer system for wireless power transfers.

FIGS. 2A and 2B show an overview of an ideal capacitor and a capacitor with an air layer.

FIGS. 4A and 4B illustrate a deformable transfer layer on a rough surface and a curved surface in accordance with an embodiment of the invention.

FIG. 5 illustrates how to use a deformable transfer layer as a replacement for a dielectric layer in accordance with an embodiment of the invention.

FIG. 6 illustrates a transfer layer enclosing a liquid, for example, water.

Figure 3:
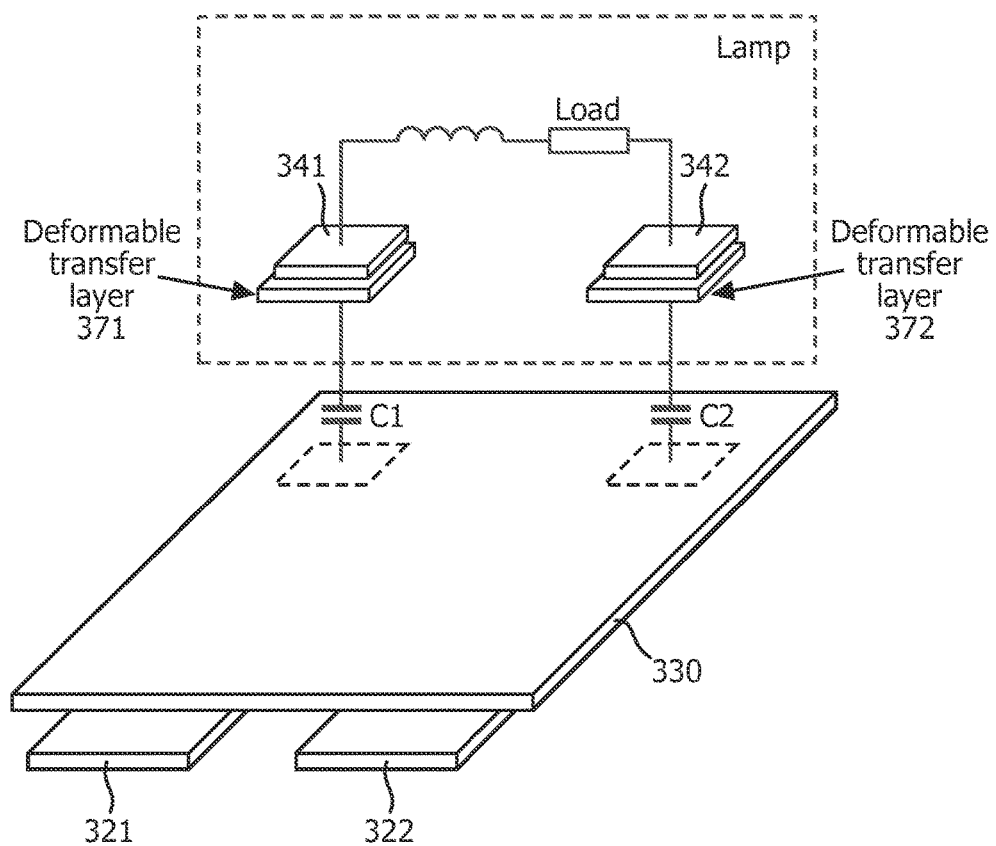
FIG. 3 illustrates a capacitive power transfer system with deformable transfer layers in accordance with an embodiment of the invention.

It is important to note that the embodiments disclosed are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

A capacitive power transfer system can be utilized to transfer power over large areas that have a flat structure, such as windows, walls, floors, etc. An example of such a capacitive power transfer system is depicted in FIG. 1 as system 100. As illustrated in FIG. 1, a typical arrangement of such a system includes a pair of receiver electrodes 141, 142 connected to a load 150 and an inductor 160. The system 100 also includes a pair of transmitter electrodes 121, 122 connected to a power driver 110. There is also an insulating layer 130.

The transmitter electrodes 121, 122 are arranged on one side of the insulating layer 130, and the receiver electrodes 141, 142 are arranged on the other side of the insulating layer 130. A power is supplied to the load 150 by placing the receiver electrodes 141, 142 in proximity to the transmitter electrodes 121 and 122 on either side of the insulating layer 130, without having a direct contact between the two. This arrangement forms capacitive impedance between the pair of transmitter electrodes 121, 122 and the receiver electrodes 141, 142. Therefore, a power signal generated by the driver controller 110 is wirelessly transferred from the transmitter electrodes 121, 122 to the receiver electrodes 141, 142 to power the load 150. Thus, no mechanical connector or any electrical contact is required in order to power the load 150.

In an embodiment, the connection between the transmitter electrodes 121,122 to the driver 110 is by means of a galvanic contact. In another embodiment, a capacitive in-coupling can be applied between the driver 110 and the electrodes 121,122, whereby no wire connections are needed. This embodiment is advantageous in a modular infrastructure for easy extension of the infrastructure.

The system shown in FIG. 1 includes two optional inductors 112 and 160, which match the power signal frequency to a series-resonant frequency of the system, thereby improving the efficiency of the power transfer.

The driver controller 110 outputs an AC voltage signal having a frequency substantially the same as the series-resonant frequency of a circuit consisting of a series of the capacitors (C1 and C2) and inductors 112, 160. The capacitors (C1 and C2) are the capacitive impedance of the transmitter electrodes 121, 122 and receiver electrodes 141, 142 (shown in dotted lines in FIG. 1). The capacitive impedances of capacitors (C1 and C2) and the inductance of inductor 160 cancel each other at the resonance frequency, resulting in a low-ohmic circuit. The driver controller 110 generates an AC signal of which amplitude, frequency, and waveform can be controlled. The output signal typically has amplitude of tens of volts and a frequency of up to a few Mega Hertz (MHz). In an exemplary embodiment, the output signal is typically 50V/400 kHz. Thus, the system 100 is capable of delivering power to the load 150 with low power losses.

As a non-limiting example, the inductors 112 and 160 may be a tunable inductor (e.g., gyrator type of tuning). In addition, the system 100 may include a variable capacitor or a bank of switched capacitors to control the capacitance.

In an embodiment, the driver 110 senses the phase of the voltage and current at its output to determine if the system 100 is tuned. In another embodiment, the phase of the voltage and current are measured in the receiver electrodes 141, 142. In both embodiments, the system 100 is tuned when the maximum current flows through the load 150. That is, the series-resonance frequency and the signal frequency do not match. The sensing may be performed at the operating frequency and higher harmonics of the same.

The load may be, for example, a LED, a LED string, a lamp, displays, computers, power chargers, loudspeakers, and the like. For example, the system 100 can be utilized to power lighting fixtures installed on a wall.

The insulating layer 130 is a thin layer substrate material that can be of any insulating material, including for example, air, paper, wood, textile, glass, DI-water, and so on. In an embodiment, a material with dielectric permittivity is selected. The thickness of the insulating layer 130 is typically between 10 microns (e.g., a paint layer) and a few millimeters (e.g., a glass layer).

The transmitter electrodes 121, 122 are comprised of two separate bodies of conductive material placed on one side of the insulating layer 130 that is not adjacent to the receiver electrodes 141, 142. For example, as illustrated in FIG. 1, the transmitter electrodes 121, 122 are at the bottom of the insulating layer 130. In another embodiment, the transmitter electrodes 121, 122 can be placed on opposite sides of the insulating layer 130. The transmitter electrodes 121, 122 can be any shape including, for example, a rectangle, a circle, a square, or combinations thereof. The conductive material of each of the transmitter electrode may be, for example, carbon, aluminum, indium tin oxide (ITO), organic material, such as PEDOT, copper, silver, conducting paint, or any conductive material.

The receiver electrodes 141, 142 can be of the same conductive material as the transmitter electrodes 121, 122 or made of different conductive material. The total capacitance of the system 100 is formed by the overlap areas of respective transmitter and receiver electrodes 121, 141, and 122, 142, as well as the thickness and material properties of the insulating layer 130. The capacitance of the system 100 is illustrated as C1 and C2 in FIG. 1. In order to allow electrical resonance, the system 100 should also include an inductive element. This element may be in a form of one or more inductors that are part of the transmitter electrodes or the receiver electrodes, distributed over the driver 110 and the load (e.g., inductors 160 and 112 shown in FIG. 1), inductors incorporated within insulating layer 130, or any combination thereof. In an embodiment, an inductor utilized in the system 100 can be in a form of a lumped coil.

The load 150 allows for an AC bi-directional current flow. In an embodiment, the load 150 may include a diode or an AC/DC converter to locally generate a DC voltage. The load 150 may further include electronics for controlling or programming various functions of the load 150 based on a control signal generated by the driver 110. To this end, in an embodiment, the driver 110 generates a control signal that is modulated on the AC power signal. For example, if the load 150 is an LED lamp, a control signal output by the driver 110 may be utilized for dimming or color setting of the LED lamp.

Another embodiment for dimming and/or color setting of a lamp acting as a load 150 includes misplacing the transmitter and receiver electrodes, i.e., when the respective electrodes 121/141 and 122/144 do not fully overlap each other. In such a case, the electrical circuit is out of resonance, whereby less power is transferred from the driver 110 to the lamp (load 150). The state in which the circuit does not resonate is also referred to as detuning.

Other embodiments for detuning the system 100 include adding capacitance, inductance or resistance in the load 150 (e.g., lamp), or in the path from the driver 110 to the lamp, placing the lamp on or at another location of the infrastructure, or using a feedback signal generated by the lamp and sent to the driver 110. The feedback is provided using a button on the lamp that generates a short detuning that is measured in the driver. The driver 110, based on the feedback, changes the power and/or the frequency of the output's AC signal.

In an embodiment, the correct placement of the receiver electrodes 141,142 with respect to the transmitter electrodes 121, 122 can be determined using a location indicator that provides an indication when the maximum power or power above a predefined threshold is transferred from the driver 110 to the load 150. The location indicator may be part of the driver 110 or integrated in the load 150. The indication may be in form of, for example, a lit LED, a sound, a liquid crystal display for displaying a message or a measure of the transferred power, and so on. It should be further noted that the location indicator can also be utilized to detect power hot spots in the system 100.

The capacitive powering system 100, as exemplary illustrated in FIG. 1, depicts a single load 150 that is powered by the driver 110. However, it should be noted that the driver 110 can also power multiple loads, each of which may be tuned to a different operational frequency. In such a configuration, the frequency of a signal outputted by the driver 110 determines which device will be powered. The driver 110 may also generate an AC sweep signal (a signal with a varied frequency). When fast enough, the frequency sweep will power the devices during the period that the frequency of the AC signal coincides with respective load resonance tuning. In this way, several loads tuned at different frequencies can be powered in a multiplexed way. To fill the power-less gaps in between sweeps, batteries and/or capacitors can be added.

In another embodiment, a spread spectrum powering of the load is provided. Accordingly, an AC power signal characterized by a large band of frequencies is generated by the driver 110, allowing each individual load in a group of multiple loads to be tuned within a range of different frequencies, whereby each individual load may be powered independently.

In capacitive powering systems that include multiple loads, the power consumed by the different loads may be different from each other. The power of the AC signal is determined by the load that consumes the highest power. When a "high power load" and a "low power load" are connected in the system, the power AC signal can damage the latter load. To overcome this problem an overload protection is required.

Because the capacitive coupling between the transmitter electrodes and the receiver electrodes depends on the distance between the electrodes, as well as the dielectric property of the transfer layer between the electrodes, the power drive controller or power transferrer device and power receiver device are typically in close proximity to each other in order to provide for an efficient power transfer. Without loss of generality, a power transferrer device referred to herein is a device that transfers power to a power receiver device; and a power receiver device referred to herein is a device that receives power from a power transferrer device, and a power receiver device includes a load that consumes the power.

However, in a practical environment, it is very difficult to control the flatness and the roughness of the flat structure over which the power is to be transferred, such as walls, floors, etc. A floor or wall surface and/or a cover layer may be uneven or rough. For example, the surface and/or cover layer of FIG. 1 shown as infrastructure 130 may not be flat and have an uneven surface area. When the electrode of a power receiving device, for example, electrodes 141 and 142, are placed on such an uneven surface the value of the capacitance (C1 and C2) that is created is not constant. This is due to variation of the average distance between the transmitter and receiver electrodes and different dielectric constants across the surface, for example, due to the fact that there may be air between certain portions of the uneven surface and the electrode. Air has a much lower relative permittivity $\varepsilon_r$ than the floor's surface and/or cover layer, resulting in an additional variation of the capacitance (C1 and C2). As a result there can be a considerable spread in the value of the capacitance that gives rise to non-uniform operating conditions of the capacitive power transfer system.

Furthermore, since the capacitors (C1 and C2) are part of the resonance circuit, another consequence of the variation in the capacitance is that the circuit may no longer be in resonance, resulting in less efficiency and/or less power transfer in the capacitive power transfer system. Although a feedback loop may provide some advantage in controlling the variation in capacitance, the capacitance could still vary so much that at the new operating point the power transfer is not optimal, i.e., less efficient, unstable, out-of range, etc.

Certain embodiments herein describe a deformable transfer layer arranged between the receiver electrodes and the surface and/or cover layer shown as infrastructure 130 in FIG. 1. Advantageously the deformable transfer layer controls the capacitance, for example by minimizing the amount of air between the infrastructure 130 and the transmitter and receiver electrodes. In one embodiment this deformable transfer layer is a thin deformable layer that is placed between the contacts to accommodate surface roughness and imperfect flatness. Since the capacitance of a pair of electrodes depends on the distance between the electrodes, the thickness of the deformable transfer layer is considered "thin" if the added thickness does not significantly change the capacitance or cause the capacitive power transfer system move out of the operating range.

One embodiment disclosed herein includes a receiver device for receiving power wirelessly from a transmitter device having a pair of transmitter electrodes placed on one side of a surface, the receiver device comprising: a pair of receiver electrodes for capacitively coupling with the pair of transmitter electrodes; and a deformable transfer layer placed between each of the pair of the receiver electrodes and another side of the surface; wherein a power signal generated by a power driver is wirelessly transferred from the pair of transmitter electrodes to the pair of receiver electrodes to power a load included in the power receiver device.

The above load may be in series with an inductor in the power receiver device, wherein a frequency of the power signal substantially matches a series-resonance frequency of the inductor in the power receiver device and a capacitive impedance between the first and second capacitors.

As discussed above, a capacitance variation may result from surface roughness and/or non-perfect flatness of a surface, i.e., curved. Furthermore, if the receiver is removed and/or displaced mechanically (it is pulled or pushed), the capacitance can change dynamically. FIG. 2A shows an ideal capacitor having a dielectricum 202 set in between two contacts 201 and 203. Note that a dielectricum is a dielectric medium which is an electrical insulator and can be polarized by an applied electric field. FIG. 2B shows a capacitor in a practical situation, where the first contact has a rough surface, and thus there is a layer of air 204 between the first contact 201 and the dielectricum 202. As mentioned, air has a much lower relative permittivity $\varepsilon_r$ resulting in a variation of the capacitance.

FIG. 3 shows an embodiment of the invention, in which a deformable transfer layer 371, 372 is placed between each of the receiver electrodes 341, 342 and the panel surface 330 under which the transmitter electrodes 321, 322 reside. To realize a deformable transfer layer for efficient power transfers, a material is chosen with a high $\varepsilon_r$ value. High $\varepsilon_r$ of the deformable transfer layer material minimizes the variation in capacitance due to surface roughness and non-perfect flatness of the contacts. In one embodiment, the deformable transfer layer comprises of silicone.

FIG. 3 illustrates the deformable transfer layer 371, 372 placed between each of the receiver electrodes 341, 342 and the panel surface 330. A deformable transfer layer may likewise be placed between the transmitter electrodes 321, 322 and the panel.

As shown in FIGS. 4A and 4B, according to an embodiment of the invention, the deformable transfer layer 481 is used as an interlayer between a contact surface and the dielectricum to minimize the effect on the capacitor value due to surface roughness and/or non-perfect flatness of the surface. FIG. 4A shows that the deformable transfer layer 481 is placed between a first contact and the dielectricum. The deformable transfer layer 481 fits into any rough or uneven surface areas between the dielectricum and the first contact. FIG. 4B shows that the deformable transfer layer 481 conforms to the curvature of the contact surface of the first contact and the dielectricum. While FIGS. 4A and 4B show the deformable transfer layer 481 utilized between the first contact and the dielectricum, similarly the deformable transfer layer 481 may be utilized between the second contact and the dielectricum or between both.

In one embodiment, the deformable transfer layer is an elastic layer. Elastic materials can return to their original shape in the absence of force. Different embodiments utilize other materials, such as flexible and compliant materials and deformable materials that can be brought back to their original shape by an application of force.

As shown in FIG. 5, according to an embodiment of the invention, the deformable transfer layer 581 is used as a replacement for the dielectricum layer. Since the dielectricum layer is a thin layer, the system is very sensitive to damage done to this layer.

In another embodiment, the deformable transfer layer is a soft electrically conducting layer. In this embodiment, the deformable transfer layer is a piece of electrically conducting foam. This soft electrically conducting layer advantageously reduces the effects of an uneven or rough surface on the capacitance between the transmitter and receiver electrodes.

FIG. 6 shows an embodiment in which chambers 681 are created inside the deformable transfer layer 680, and the chambers are filled with a liquid, for example, water, which has a high $\varepsilon_r$ of 80.

In another embodiment, a hydrogel layer is used as the deformable transfer layer, because hydrogel is deformable and the largest volume fraction of the hydrogel is water, which has a high $\varepsilon_r$. Other gels that have high $\varepsilon_r$ may also be used.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

The invention claimed is:

1. A power receiver device for receiving power wirelessly from a transmitter device having a pair of transmitter electrodes placed on one side of a rigid structure, the power receiver device comprising:
    a pair of receiver electrodes capacitively coupled with the pair of transmitter electrodes through the rigid structure; and
    a deformable transfer layer placed between each of the pair of the receiver electrodes and another side of the rigid structure,
    wherein the deformable transfer layer conforms to the another side of the rigid structure;

wherein a power signal generated by a power driver is wirelessly transferred from the pair of transmitter electrodes to the pair of receiver electrodes to power a load included in the power receiver device, and wherein the deformable transfer layer comprises a plurality of chambers filled with a liquid.

2. The power receiver device of claim 1, wherein the deformable transfer layer is made of an elastic material.

3. The power receiver device of claim 1, wherein the deformable transfer layer is made of a high dielectric constant material.

4. The power receiver device of claim 1, wherein the deformable transfer layer is made of silicone.

5. The power receiver device of claim 1, wherein the deformable transfer layer is made of an electrically conducting material.

6. The power receiver device of claim 1, wherein the deformable transfer layer is made of hydrogel.

7. The power receiver device of claim 1, wherein the liquid is water.

8. The power receiver device of claim 1, wherein the load is in series with an inductor in the power receiver device, wherein a frequency of the power signal substantially matches a series-resonance frequency of the inductor in the power receiver device and the capacitive impedances of the pair of receiver electrodes coupled with the pair of transmitter electrodes.

9. The power receiver device of claim 1, wherein the power signal generated by the power driver is wirelessly transferred from the pair of transmitter electrodes to the pair of receiver electrodes through the deformable transfer layer.

* * * * *